(12) United States Patent
Krygowski (10) Patent No.: US 8,116,213 B2
(45) Date of Patent: Feb. 14, 2012

(54) TRACING ROUTES AND PROTOCOLS (75) Inventor: Adrian M Krygowski, Washington, DC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 139 days.

(21) Appl. No.: 12/429,262

(22) Filed: Apr. 24, 2009

(65) Prior Publication Data

US 2010/0271960 A1    Oct. 28, 2010

(51) Int. Cl.
  *H04L 12/26*    (2006.01)
(52) U.S. Cl. ........................................ 370/248; 370/389
(58) Field of Classification Search ................. 370/389, 370/390, 236, 351; 709/230
See application file for complete search history.

(56) References Cited

U.S. PATENT DOCUMENTS

| | | | | |
|---|---|---|---|---|
| 7,684,382 B2* | 3/2010 | Ishii et al. | | 370/351 |
| 7,706,278 B2* | 4/2010 | Wing et al. | | 370/236 |
| 2007/0192501 A1* | 8/2007 | Kompella | | 709/230 |
| 2009/0016335 A1* | 1/2009 | Bays | | 370/389 |
| 2010/0014518 A1* | 1/2010 | Duncan et al. | | 370/390 |

* cited by examiner

*Primary Examiner* — Kwang B Yao
*Assistant Examiner* — Syed M Bokhari (57) ABSTRACT

A computer-readable medium may include computer-executable instructions. The computer-executable instructions including instructions for receiving a request to trace a route, in a network, from a source device to a target device and to identify protocols that are associated with the route, sending at least one test packet toward the target device, receiving at least one reply packet from the network, examining payload of the reply packet to determine the route and to identify the protocols, and outputting description of the route and identities of the protocols.

17 Claims, 11 Drawing Sheets

TRACING ROUTES AND PROTOCOLS

BACKGROUND INFORMATION

An ability to identify a path or route through which network traffic flows may be helpful in modifying, debugging, and/or configuring networks. Typically, to identify a path/route, a network administrator or a user may send test packets from one device toward a target device. By examining reply packets from the network, the network administrator or the user may determine the path/route via which packets have reached the target device.

DETAILED DESCRIPTION OF PREFERRED EMBODIMENTS

The following detailed description refers to the accompanying drawings. The same reference numbers in different drawings may identify the same or similar elements. Herein, the terms "route" and "path" may be used synonymously or interchangeably. A network path/route may be established by a series of adjacent routers/switches at a given network communication layer.

Figure 1:
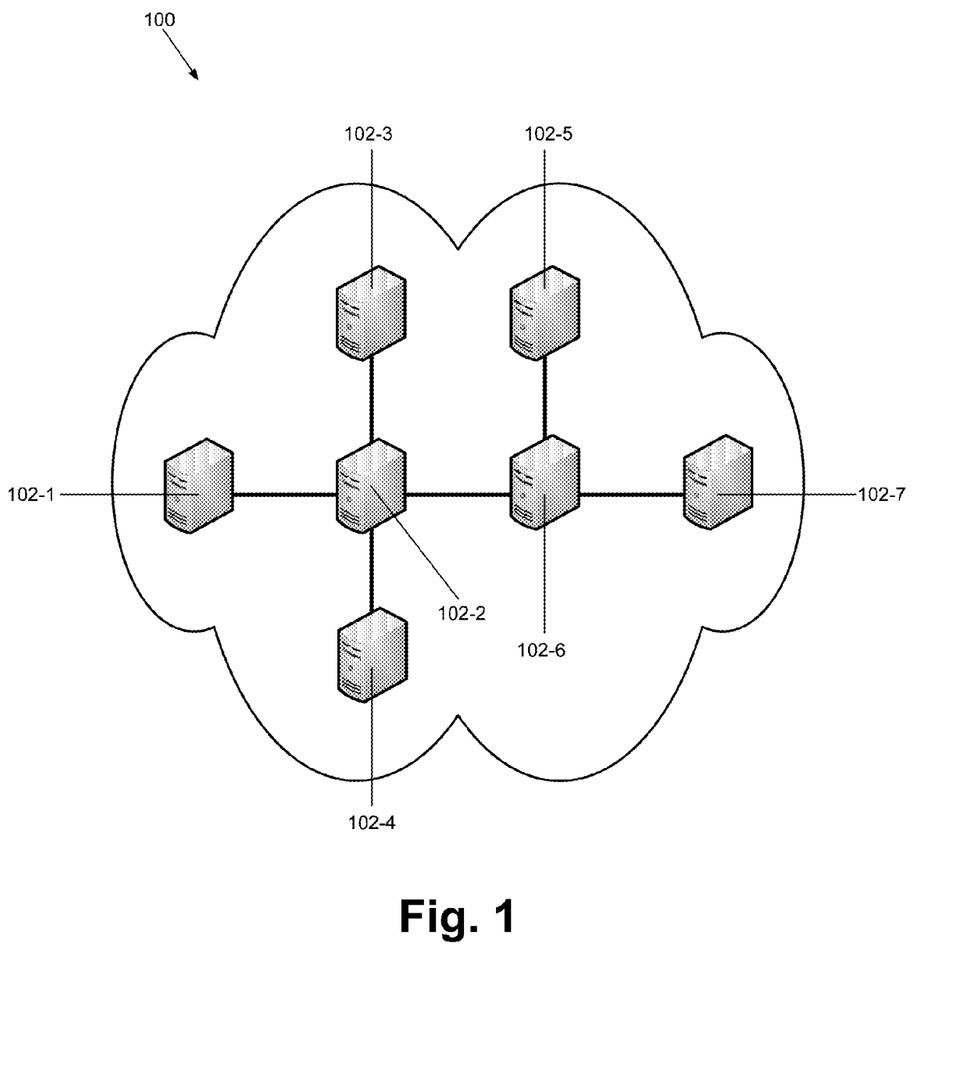
FIG. 1 is a diagram illustrating an exemplary network in which concepts described herein may be implemented.

As described below, a network device may trace a route that extends from the network device to another device in a network, and identify protocols that are associated with the route. FIG. 1 shows an exemplary network 100 in which concepts described herein may be implemented. In one embodiment, network 100 may include one or more wired and/or wireless networks that are capable of exchanging information, such as voice, video, documents, multimedia, text, etc. For example, network 100 may include one or more public switched telephone networks (PSTNs) or another type of switched network. Network 100 may also include one or more wireless networks and may include a number of transmission towers for receiving wireless signals and relaying the received signals toward the intended destination. Network 100 may further include one or more packet switched networks, such as an Internet Protocol (IP) based network, a local area network (LAN), a wide area network (WAN), a personal area network (PAN), an intranet, the Internet, or another type of network that is capable of exchanging information.

As shown, network 100 may include network devices 102-1 through 102-7 (collectively network devices 102 and individually network device 102-x). For simplicity and ease of understanding, network 100 of FIG. 1 does not show other network components, such bridges, wireless devices, etc.

Network device 102-x may include software and/or hardware components for sending test packets toward a target device in network 100 and for receiving reply packets from other network devices 102. Based on the reply packets, network device 102-x may determine a route from network device 102-x to the target device, and identify routing/communication protocols that are associated with the route. In addition, network device 102-x may include routing/switching mechanisms for signaling control information, exchanging routing information, and/or forwarding packets.

Figure 2:
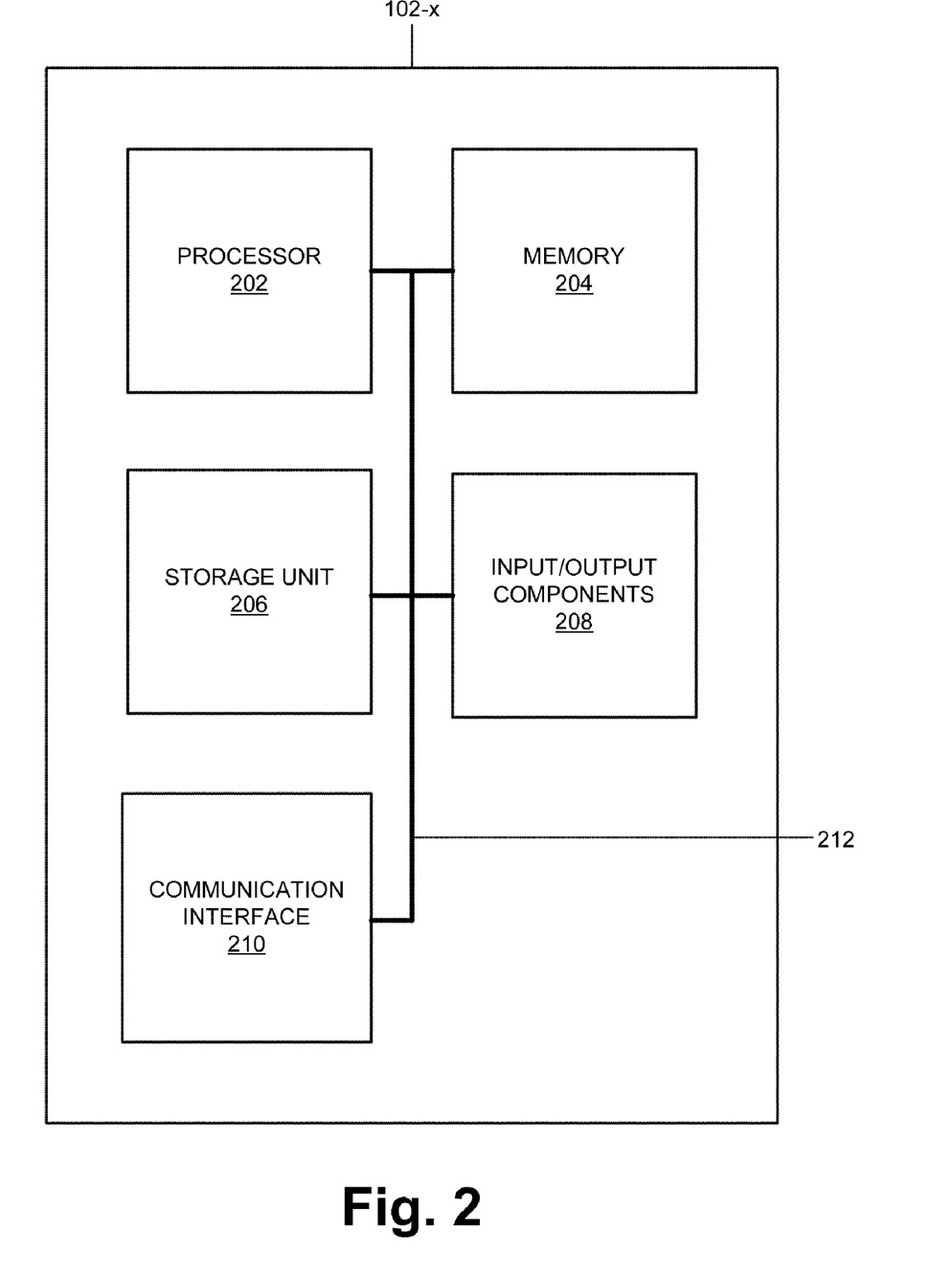
FIG. 2 is a block diagram of an exemplary network device shown in FIG. 1.

FIG. 2 is a block diagram illustrating exemplary components of network device 102-x. As shown in FIG. 2, network device 102-x may include a processor 202, memory 204, storage unit 206, input/output components 208, communication interface 210, and bus 212.

Processor 202 may include one or more processors, microprocessors, application specific integrated circuits (ASICs), field programmable gate arrays (FPGAs), or other processing logic that may interpret and execute instructions. Memory 204 may include static memory, such as read only memory (ROM), and/or dynamic memory, such as random access memory (RAM) or onboard cache, for storing data and machine-readable instructions. Storage unit 206 may include a magnetic and/or optical storage/recording medium. In some embodiments, storage unit 206 may be mounted under a directory tree or may be mapped to a drive.

Input/output components 208 may include a keyboard, a mouse, a speaker, a microphone, a Digital Video Disk (DVD) writer, a DVD reader, Universal Serial Bus (USB) lines, and/or other types of components for converting physical events or phenomena to and/or from digital signals that pertain to network device 102-x.

Communication interface 210 may include any transceiver-like mechanism that enables network device 102-x to communicate with other devices and/or systems. For example, communication interface 210 may include mechanisms for communicating via a network. In these embodiments, communication interface 210 may include one or more network interface cards (e.g., an Ethernet interface) for communicating with other devices. In other implementations, communication interface 210 may include radio frequency (RF) transmitters, receivers and/or transceivers and one or more antennas for transmitting and receiving RF data. For example, communication interface 210 may include a radio or television tuner, a mobile telephone transceiver, etc. Bus 212 may provide an interface through which components of network device 102-x can communicate with one another.

In FIG. 2, network device 102-x is illustrated as including components 202-212 for simplicity and ease of understanding. In an actual implementation, network device 102-x may include additional, fewer, or different components. For example, network device 102-x may include one or more power supplies, fans, motherboards, video cards, etc. In another example, when network device 102-x is implemented as a router or a switch, network device 102-*x* may include components that belong to either a control plane or a data plane.

Figure 3:
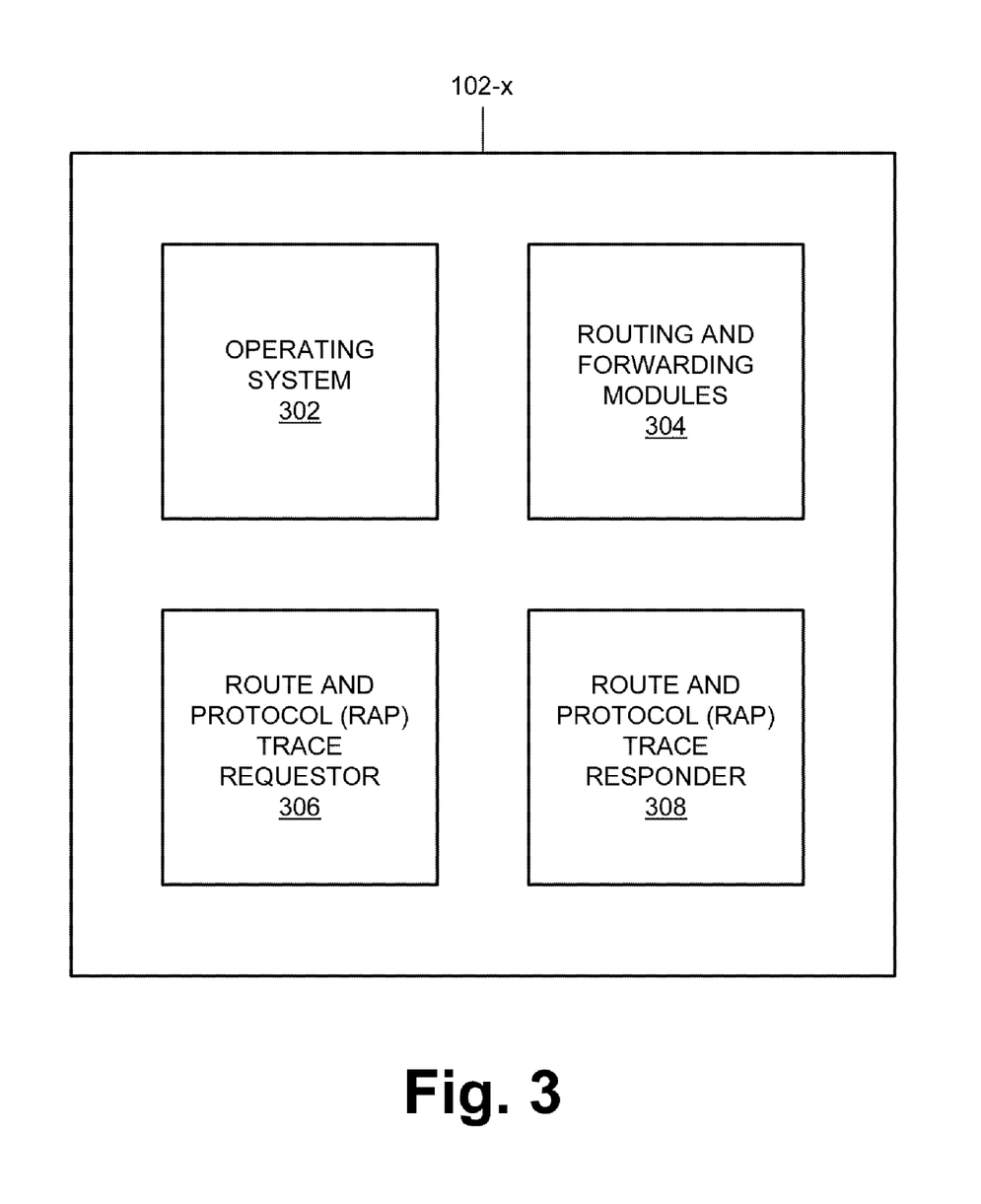
FIG. 3 is a block diagram illustrating exemplary functional components of the network device shown in FIG. 1.

FIG. 3 is a block diagram illustrating exemplary functional components of network device 102-*x*. As shown, network device 102-*x* may include an operating system 302, routing and forwarding modules 304, a route and protocol (RAP) trace requester 306, and a RAP trace responder 308. Operating system 302 may manage hardware and software resources of network device 102-*x*. Operating system 302 may manage, for example, its file system, device drivers, communication resources (e.g., transmission control protocol (TCP)/IP stack), event notifications, etc. Routing and forwarding modules 304 may include mechanisms for signaling routing information and/or forwarding packets.

RAP trace requester 306 may include hardware and/or software components (e.g., a graphical user interface, a command line user interface, etc.) for receiving user input instructing RAP trace requester 306 to identify a route that a packet may take to travel from network device 102-*x* to a target device (e.g., another network device 102-*x*). After receiving the user input, RAP trace requester 306 may send test packets, in response to which other network devices 102 may provide reply packets. RAP trace requester 306 may examine the reply packets to identify the route/path traveled by the test packets.

RAP trace responder 308 may respond to received test packets by sending reply packets. In one implementation, RAP trace responder 308 may respond to test packets implemented as User Datagram Protocol (UDP) packets, by sending Internet Control Message Protocol (ICMP) reply packets. More specifically, when a test packet arrives and a time-to-live (TTL) field of the test packet is set to zero, RAP trace responder 308 may respond with an ICMP reply packet. The ICMP reply packet may indicate that network device 102-*x* has received the test packet and may provide the identities of the recipient network device 102-*x* and a routing or communication protocol used in handling the packet (e.g., multiprotocol label switching (MPLS) protocol, Intermediate system to intermediate system (ISIS) protocol, resource reservation protocol (RSVP), border gateway protocol (BGP), label distribution protocol (LDP), Interior gateway protocol (IGP), etc.).

In a different implementation, RAP trace responder 308 may receive a test packet, modify the test packet by placing the identity of the recipient network device 102-*x* (e.g., an IP address of network device 102-*x*) and the network protocol in a payload of the test packet, and forward the modified test packet toward the target device.

Depending on the implementation, network device 102-*x* may include fewer, additional, or different components than those illustrated in FIG. 3. For example, in one implementation, network device 102-*x* may include applications (e.g., an email server, a web server, etc.), a database, etc. In addition, one or more components of network device 102-*x* may provide the functionalities of other components. For example, in another implementation, operating system 302 and/or routing and forwarding modules 304 may provide the functionalities of RAP trace requester 306 and/or RAP trace responder 308. In such an implementation, network device 102-*x* may not include RAP trace requester 306 and/or RAP trace responder 308.

Figure 4:
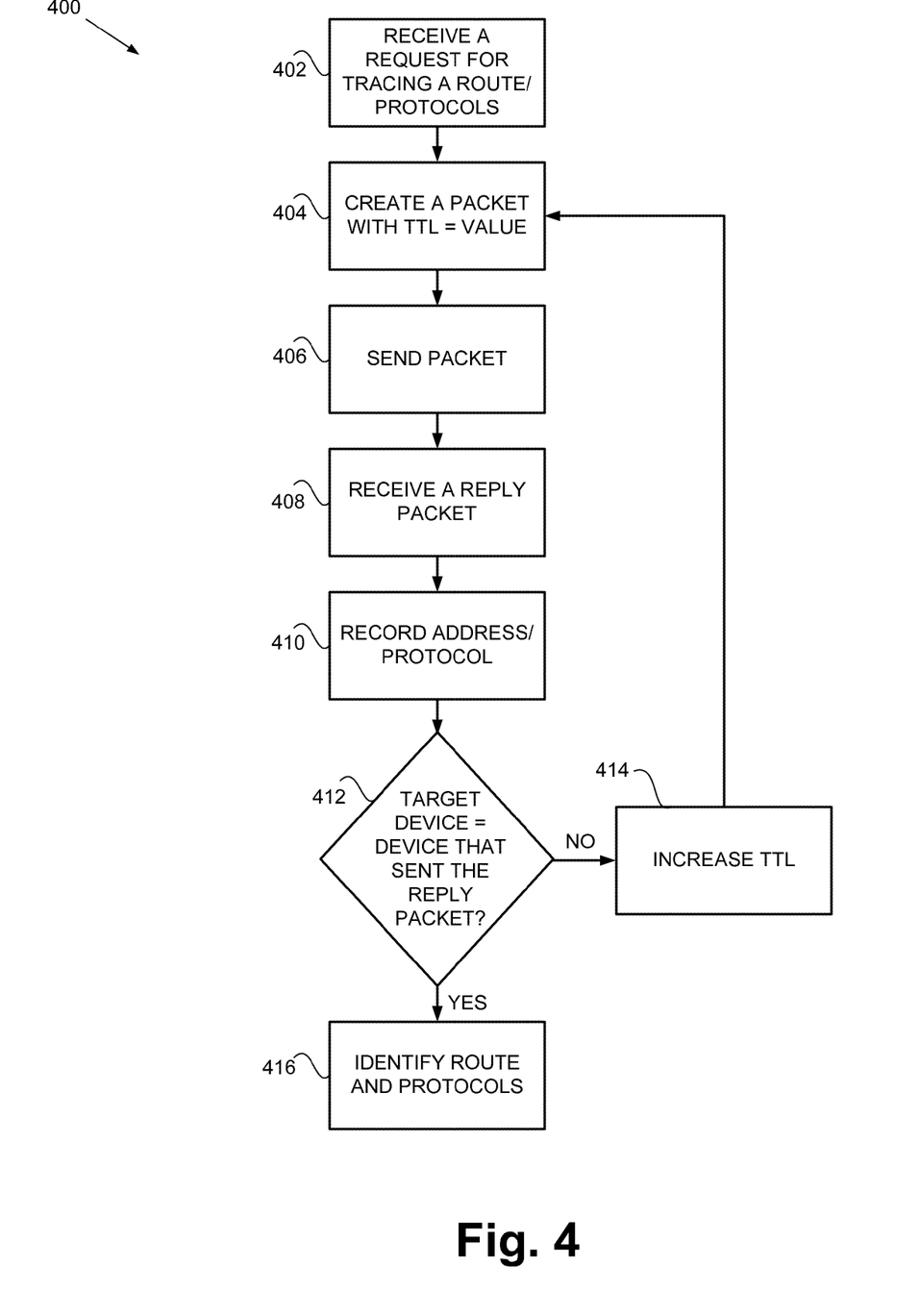
FIG. 4 is a flow diagram of an exemplary process that is associated with the network device of FIG. 1.
Figure 5A:
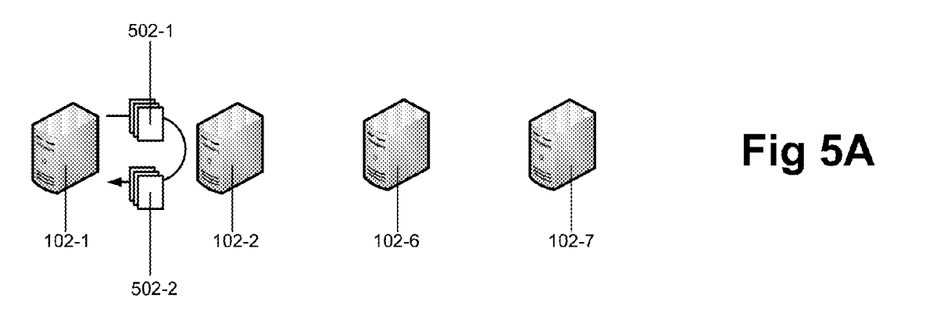
FIGS. 5A through 5C illustrate paths through which test packets and reply packets from the network device of FIG. 1 may travel in accordance with one exemplary implementation.
Figure 5B:
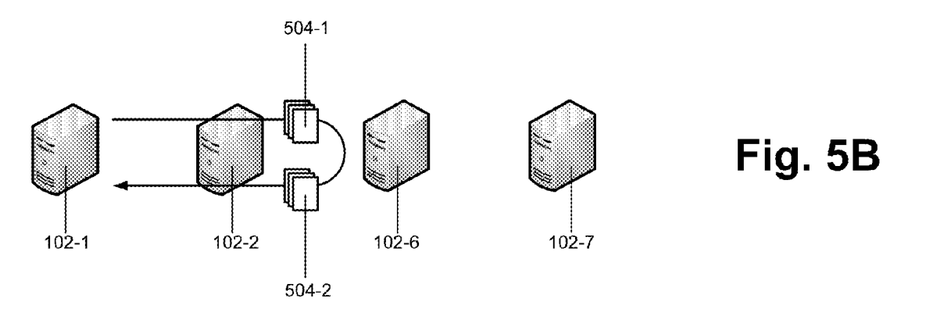
Figure 5C:
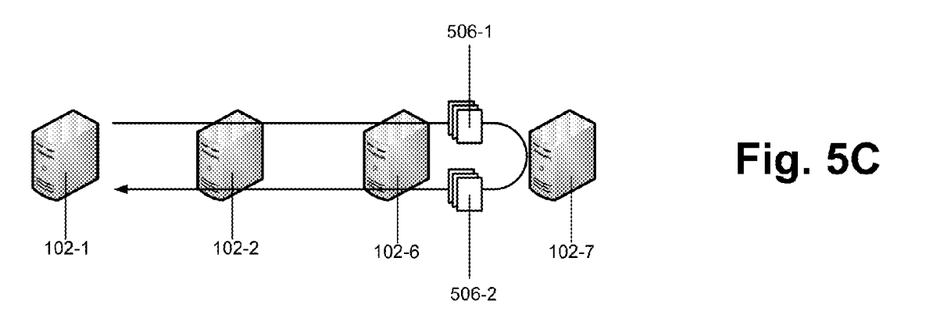

FIG. 4 is a flow diagram of an exemplary process 400 that is associated with network device 102-*x* for tracing routes and protocols. In process 400, network device 102-*x* may send a series of test packets toward a target device, and may examine reply packet from the other network devices 102 to identify a route to the target device and protocols that are associated with the route. FIGS. 5A through 5C illustrate a route/path through which the test packets and reply packets to/from network devices 102 may travel.

As shown in FIG. 4, process 400 may begin with RAP trace requester 306 receiving a request for tracing a route and protocols that are associated with the route (block 402). In one implementation, the request may have been received from a user or another device. The request may specify a target device toward which test packets are to be sent and/or the type of protocols that are to be traced (e.g., a communication protocol or routing protocol).

In response to the request, RAP trace requester 308 may create a packet with its time-to-live field (TTL) set to a specific value (block 404). The value may be selected such that the time-to-live elapses before the packet reaches a particular network device that is located between network device 102-*x* and the target device.

For example, as shown in FIG. 5A, network device 102-1 may create a packet in response to a request to trace a route/protocol between network device 102-1 and network device 102-7. In addition, RAP trace requester 306 in network device 102-1 may set the TTL of the packet to zero. When network device 102-2 (e.g., a network device between network device 102-1 and target network device 102-7) receives the packet, network device 102-2 may recognize that TTL has expired.

Network device 102-*x* may send the test packet (block 406). Continuing with the previous example, as shown in FIG. 5A, network device 102-1 may forward test packet 502-1 toward network device 102-7. However, although test packet 502-1's destination is network device 102-7, because test packet 502-1's TTL is set to zero, network device 102-2 will not forward test packet 502-1 toward network device 102-7 when network device 102-2 receives test packet 502-1. That is, test packet 502-1 is expired.

Network device 102-*x* may receive a reply packet (block 408). In response to a test packet, a network device (e.g., network device 102-2) may create and send a reply packet. The reply packet may identify the recipient network device and a routing/communication protocol between the network device and a prior-hop network device. For example, in FIG. 5A, network device 102-2 may create and send reply packet 502-2 in response to test packet 502-1. The reply packet may provide the IP address or other network address of network device 102-2 and identify the communication protocol over which test packet 502-1 is sent from network device 102-1 to network device 102-2 (e.g., MPLS protocol). Subsequently, network device 102-1 may receive reply packet 502-2.

Network device 102-*x* may record the address of the network device that sent the reply packet and the protocol identified by the reply packet (block 410). For example, in FIG. 5A, when network device 102-1 receives reply packet 502-2, network device 102-1 may record a source address that is associated with reply packet 502-2 and the protocol identified by the reply packet. In some implementations, network device 102-*x* may provide an output, for example, via a display when the reply packet is received. The output may include the source address and/or the protocol.

Network device 102-*x* may determine whether the reply packet has been sent from the target device (block 412). For example, in FIG. 5A, network device 102-1 may determine whether network device 102-2, which sent reply packet 502-2, is the target device. In one implementation, network device 102-1 may compare the IP address of network device 102-2 to the IP address of the target device to determine whether the network device 102-2 is the target device.

If the network device that sent the reply packet is not the target device, network device 102-x may increment the value of TTL (block 414) and return to block 404, where network device 102-x may create a new test packet with the new value of TTL (block 404). In addition, network device 102-x may send the new test packet (block 406), receive a new reply packet (block 408), and record the address and protocol identified by the new reply packet (block 410).

FIGS. 5A and 5B illustrate the preceding. As shown, after network device 102-1 receives reply packet 502-2, network device 102-1 increments the value of TTL to, for example, 1 ms, creates a new test packet 504-1 with the TTL=1 ms, and sends test packet 504-1 toward target device 102-7. When network device 102-2 receives test packet 504-1, network device 102-2 examines the TTL of test packet 504-1. If TTL were zero, network device 102-2 would send a reply packet to network device 102-1. In such a case, the reply packet may indicate to network device 102-1 that network device 102-2 cannot forward test packet 504-1 to target device 102-7 because the lifetime of test packet 504-1 has run out. Since TTL is not zero in this example, network device 102-2 decrements the value of TTL of test packet 504-1 (e.g., by 1 ms) to zero, and forwards test packet 504-1 to network device 102-6.

When network device 102-6 receives test packet 504-1, network device 102-6 repeats the operations performed at network device 102-2. Network device 102-6 examines TTL of test packet 504-1. Because TTL is zero, network device 102-6 creates and sends a reply packet 504-2 toward network device 102-1. Reply packet 504-2 indicates to network device 102-1 that network device 102-6 cannot forward test packet 504-1 to target network device 102-7, because test packet 504-1's lifetime has run out (e.g., TTL=0). When network device 102-1 receives reply packet 504-2, network device 102-1 records the protocol associated with the reply packet 504-2 and the identity of network device 102-6.

Network device 102-1 may repeat performing acts associated with blocks 404-414 multiple times until the value of TTL becomes large enough for the test packet to reach the target device. This is illustrated in FIG. 5C. As shown in FIG. 5C, when network device 102-1 receives reply packet 504-2, network device 102-1 increments the value of TTL to 2 ms, creates a new test packet 506-1 with the TTL=2 ms, and sends test packet 506-1 toward target device 102-7. When network device 102-2 receives test packet 506-1, network device 102-2 decrements the value of TTL to 1 ms and forwards test packet 506-1 to network device 102-6. In turn, when network device 102-6 receives test packet 506-1, network device 102-6 decrements the value of TTL to 0 ms and forwards test packet 506-1 to target device 102-7. Target device 102-7 examines test packet 506-1 and sends reply packet 506-2 to network device 102-1.

At block 416, if network device 102-x that sent the reply packet is the target device, network device 102-x may identify the route via which a packet may reach the target device and the communication protocols that are associated with the route (block 416). For example, in FIG. 5C, when network device 102-1 determines that a network device that sent reply packet 506-2 is the target device, network device 102-1 may identify the route and protocols that are associated with the route. Network device 102-1 may make such determination, for example, by comparing a source IP address of reply packet 506-2 to the IP address of the target device.

In identifying the route/protocols (block 416), network device 102-1 may look up recorded addresses/protocols at block 410. For example, in FIGS. 5A through 5C, network device 102-1 may look up recorded addresses/protocols of reply packets 502-2, 504-2, and 506-2. Assume that the IP addresses/protocols for reply packets 502-2, 504-2, and 506-2 are 191.2.141.2/MPLS, 189.4.3.9/MPLS, and 141.10.198.144/unknown, respectively. The route and the protocols may be identified as {191.2.141.2, 189.4.3.9, 141.10.198.144}, and {MPLS, MPLS, unknown}.

Figure 6:
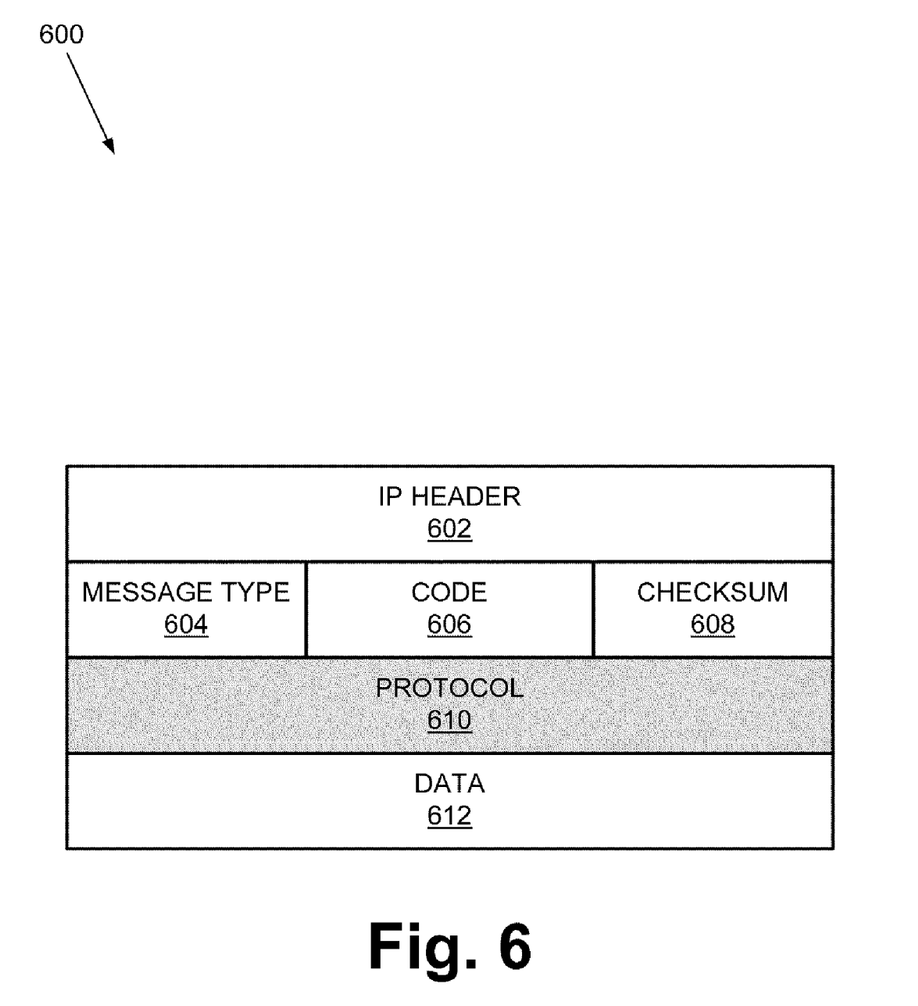
FIG. 6 is a block diagram illustrating an exemplary reply packet of FIGS. 5A through 5C.

In one implementation, the reply packets that are sent from RAP trace requester 306/RAP trace responder 308 in network devices 102 may include ICMP reply packets. FIG. 6 shows a block diagram of an exemplary ICMP reply packet 600. As shown, ICMP reply packet 600 may include IP header fields 602, a message type field 604, a code field 606, a checksum field 608, a protocol field 610, and a data field 612. Depending on the implementation, ICMP reply packet 600 may include additional, fewer, or different fields than those illustrated in FIG. 6.

IP header fields 602 may include fields that are associated with an IP packet, such as a source IP address field (e.g., the IP address of network device 102-2), a destination IP address field, etc. Message type field 604 and code field 606 may identify an ICMP packet type and/or a specific reason why IMCP reply packet is generated. For example, message type field 604 and code field 606 carrying 11 (eleven) and 0, may signify that a packet with an expired TTL has been received (e.g., TTL=0) at network device 102-x that generated ICMP reply packet 600. Checksum field 608 may provide the checksum of ICMP reply packet 600.

Protocol field 610 may identify network routing or communication protocol between network device 102-x (i.e., network device that generates and sends ICMP reply packet 600) and a network device from which a test packet with zero TTL value has been sent to network device 102-x. RAP trace responder 308 may populate protocol field 610 with a value (e.g., 0, 1, 2, ... N) that indicates a specific communication or routing protocol. For example, "1" may indicate MPLS protocol, "2" may indicate ISIS protocol, and so on.

Data field 612 may include an IP header of the test packet and the first 64 bits of data of the test packet.

Figure 7:
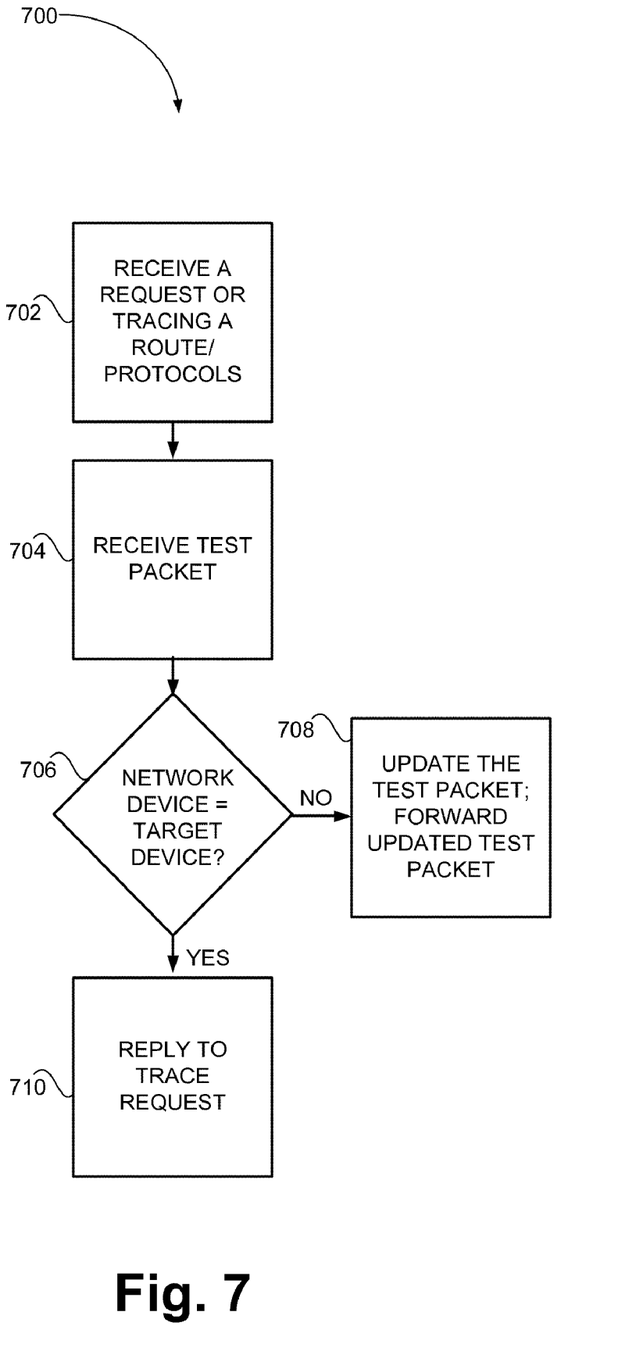
FIG. 7 is a flow diagram of another exemplary process that is associated with tracing routes and protocols.
Figure 8A:
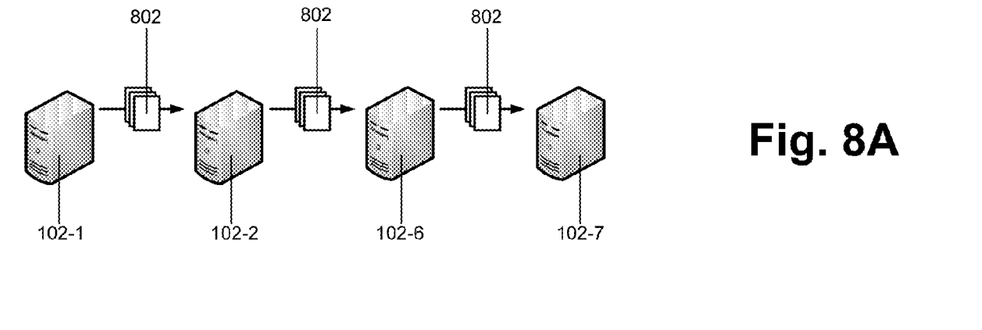
FIGS. 8A and 8B illustrate exemplary paths through which test packets and reply packets from the network device of FIG. 1 may flow according to another exemplary implementation.
Figure 8B:
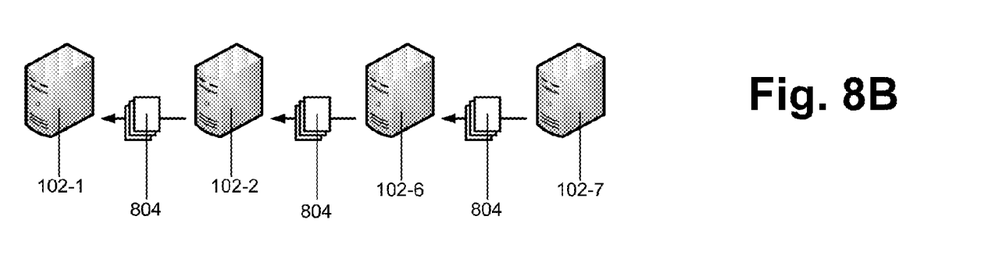

FIG. 7 is a flow diagram of another exemplary process 700 that is associated with network device 102-x tracing routes and protocols. In process 700, network device 102-x may send a test packet to a target network device. Network device 102-x may examine the reply packet from the target device to determine the route and protocols that are associated with the route. FIGS. 8A and 8B illustrate paths through which the test packet and reply packet may travel.

As shown in FIG. 7, process 700 may begin with RAP trace requester 306 in network device 102-x receiving a request for tracing a route/protocols (block 702). The request may be received in a manner similar to that described for block 402. Further, as at block 402, the request may specify a target device toward which a test packet is to be forwarded, as well as the protocol type.

A test packet may be received at another network device 102-x (block 704). After receiving the request, network device 102-x (e.g., network device 102-1) may send the test packet. Consequently, the test packet may be received at another network device 102-x. For example, as shown in FIG. 8A, network device 102-1 may send test packet 802 toward target device 102-7. Packet 802 may be received at network device 102-2.

Network device 102-x that received the test packet may determine whether network device 102-x is the target device (block 706). Continuing with the preceding example, network device 102-2 may determine whether network device 102-2 is the target device. In one implementation, to determine whether network device 102-2 is the target device, network device 102-2 may compare the IP address of network device 102-2 to that of target network device 102-7. The IP address of target network device 102-7 may be provided by the test packet.

If network device 102-*x* is not the target device (block 706—NO), network device 102-*x* that received the test packet may update and forward the test packet to a network device in the path to the target device (block 708). Updating the test packet may entail writing the identity (e.g., IP address) of network device 102-*x* and a communication/routing protocol. Depending on the implementation, the protocol may be associated with either a path between network device 102-*x* and a prior device from which the test packet was forwarded or a path between network device 102-*x* and a next hop device to which the test packet will be forwarded.

Continuing with the preceding example, network device 102-2 may update and forward test packet 802 to network device 102-6, since network device 102-2 is not target device 102-7.

If network device 102-*x* is the target device (block 706—YES), network device 102-*x* may create and send a reply packet (block 710). For example, assume that network device 102-7 receives test packet 802. Because network device 102-7 is the target device, network device 102-7 may create and send reply packet 804, for example, to network device 102-1, as illustrated in FIG. 8B.

In FIG. 8B, reply packet 804 may hop through network devices 102-6 and 102-2 to reach network device 102-1. Although the path via which reply packet 804 reaches network device 102-1 is shown as the same path by which test packet reaches target network device 102-7 from network device 102-1, in an actual implementation, the paths need not be the same.

Once the reply packet is received at network device 102-*x* that originated the test packet, network device 102-*x* may examine the reply packet and reply to the trace request, identifying the route and associated communication protocols.

Figure 9A:
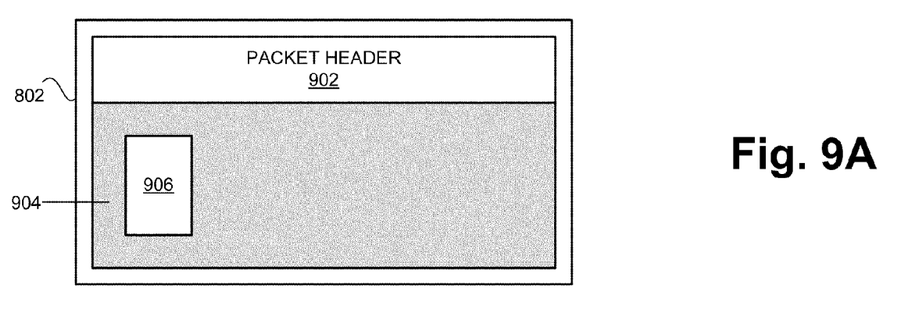
FIGS. 9A and 9B are block diagrams illustrating a test packet of FIGS. 8A and 8B.
Figure 9B:
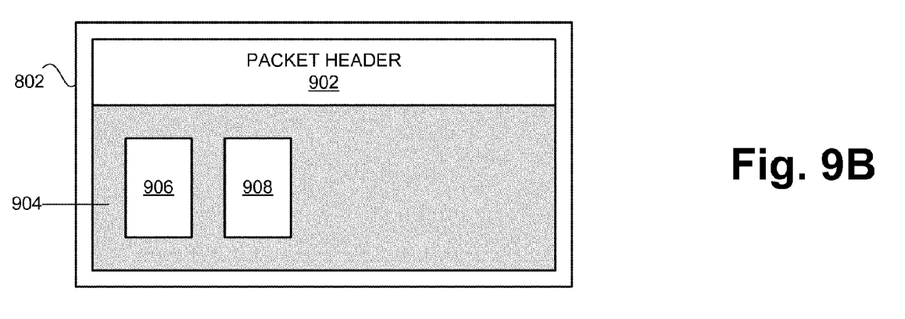

FIGS. 9A and 9B are block diagrams illustrating test packet 802 of FIG. 8A as test packet 802 moves from network device 102-1 to network device 102-7. More specifically, FIG. 9A shows test packet 802 after test packet 802 leaves network device 102-2 and before test packet 802 is received at network device 102-6.

As shown in FIG. 9A, test packet 802 may include packet header 902 and payload 904. Packet header 902 may provide typical header information, such as a source address, a destination address, a destination port number, etc. Payload 904 may carry data. As further shown in FIG. 9A, payload 904 may include trace block 906, which may indicate the IP address of network device 102-2 and a protocol for a path between network device 102-1 and 102-2. Network device 102-2 may place trace block 906 in payload 904 when network device 102-2 updates test packet 802 at block 708.

In some implementations, trace block 906 may identify, instead of a transport protocol (e.g., MPLS), a signaling protocol for routing. The signaling protocol may include, for example, resource-reservation protocol (RSVP), label distribution protocol (LDP), border gateway protocol (BGP), intermediate system-to-intermediate system protocol (ISIS), etc.

FIG. 9B shows test packet 802 when test packet leaves network device 102-6. As shown, test packet 802's payload 904 may include trace blocks 906 and 908. After network device 102-6 receives test packet 802, network device 102-6 may update test packet 802 by placing trace block 908 in payload 904 of test packet 802. Trace block 908 may indicate the IP address of network device 102-6 and a protocol between network device 102-6 and 102-7.

In process 700, network devices 102 may create and insert trace blocks on a test packet as the test packet travels toward a target device in a forward direction. In a different implementation, network devices 102 may create and insert the trace blocks on a reply packet as the reply packet travels from the target device to network device 102-*x* that originated the test packet. In still another implementation, network devices 102 may create and insert trace blocks in both the test packet and the reply packets. In such an implementation, the reply packet may include a list of network devices 102/protocols via the test packet reached the target network device, as well as a list of network devices/protocols via the reply packet reached network device 102-*x* that originated the test packet.

Figure 10:
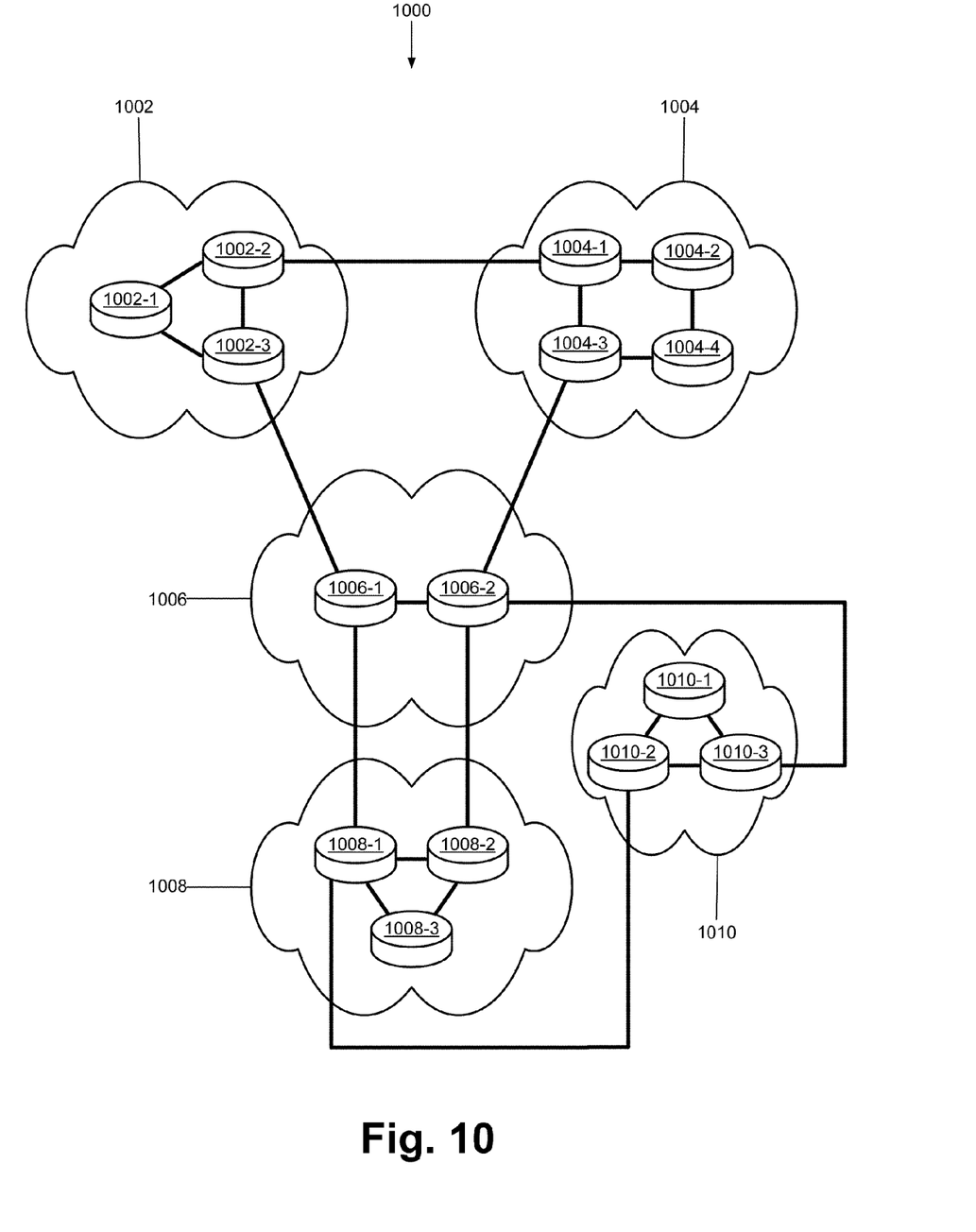
FIG. 10 illustrates an example that is associated with tracing routes and protocols.

FIG. 10 illustrates an example associated with tracing routes and protocols. The example is consistent with exemplary processes 400 and 700 described above with reference to FIGS. 4 and 7. As shown in FIG. 10, network 1000 includes hubs 1002, 1004, 1006, 1008, and 1010. As further shown, hub 1002 includes network devices 1002-1, 1002-2, and 1002-3; hub 1004 includes network devices 1004-1, 1004-2, 1004-3, and 1004-4; hub 1006 includes network devices 1006-1 and 1006-2; hub 1008 includes network devices 1008-1, 1008-2, and 1008-3; and hub 1010 includes network devices 1010-1, 1010-2, and 1010-3.

Assume that a routing protocol between hubs 1002, 1004, 1006, 1008, and 1010 is originally ISIS protocol, and that the routing protocol between hub 1010 and other hubs 1002-1008 is changed to BGP. In such a case, to test whether the routing protocol has been correctly implemented, a user may input, at network device 1002-1, a command to identify route/protocols for a route that extends from network device 1002-1 to network device 1010-2. Further, assume that the route is {network device 1002-3, network device 1006-1, network device 1006-2, network device 1010-3, network device 1010-2}.

When the user requests network device 1002-1 to identify route/protocol from network device 1002-1 to network device 1010-2, network device 1002-1 sends a test packet to network device 1010-2 via network device 1002-3, network device 1006-1, network device 1006-2, and network device 1010-3. Assuming that network devices 1002-1 through 1010-3 are implemented in accordance with process 700, the test packet may collect routing and protocol information as it travels from network device 1002-1 to network device 1010-2.

When a reply packet from network device 1010-2 is received at network device 1002-1, network device 1002-1 may examine the reply packet to identify the routing protocols (e.g., {OSPF between network devices 1002-1 and 1002-3, ISIS between network devices 1002-3 and 1006-1, OSPF between network devices 1006-1 and 1006-2, ISIS protocol between network devices 1006-2 and 1010-3, OSPF between network devices 1010-3 and 1010-2}). The user may use the list of the routing protocols provided by network device 1002-1 to verify whether the routing protocols in hubs 1002-1010 have been correctly updated.

Figure 11:
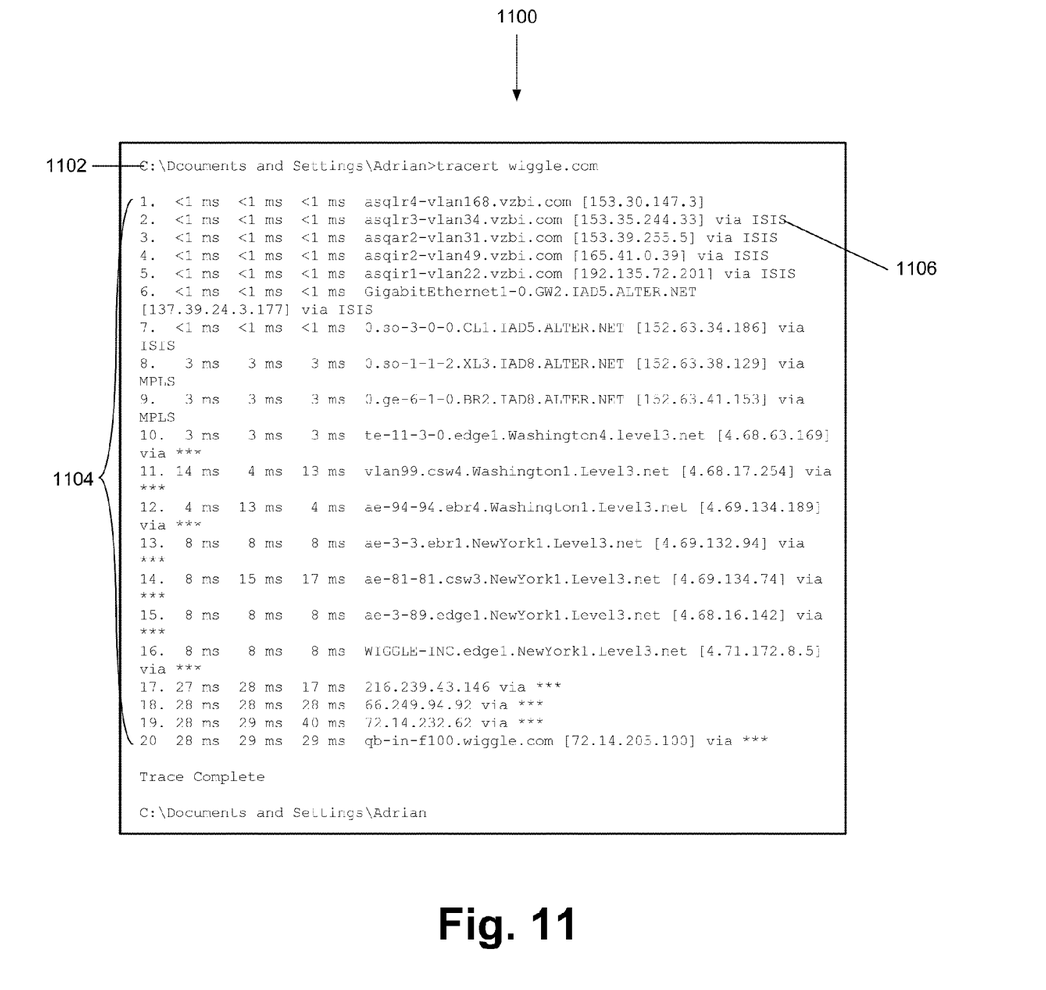
FIG. 11 illustrates an exemplary output of the network device of FIG. 1 when the network device traces a route and protocols.

FIG. 11 illustrates an exemplary output at network device 102-*x* when network device 102-*x* traces a route and protocols in accordance with process 400. As shown, a user interface 1100 of network device 102-*x* may show a user request 1102 that is input at network device 102-*x* and a response 1104 by network device 102-*x*. Depending on the implementation, network device 102-*x* may provide different user interface for interacting with the user.

Request 1102 may include a command (e.g., "tracert wiggle.com") that causes RAP trace requester 306 to send test packets and receive reply packets. Furthermore, based on the reply packets, RAP trace requester 306 may provide response 1104 to the user.

As further shown in FIG. 11, response 1104 includes output line 1106. Although FIG. 11 shows additional output lines, they are not labeled for the purpose of simplicity. Output line 1106 may include amount of time that test packets required to reach a network device 102-*x*, a name of network device 102-*x*, a network address of network device 102-*x*, and a routing protocol. For example, output line 1106 includes text "<1 ms<1 ms<1 ms asqlr3-vlan32.vzbi.com," which indicate that three test packets have been sent to a network device named "asqlr3-vlan32.vzbi.com." In addition, output line 1106 includes text "[153.35.244.33] via ISIS," indicating that an IP address of the network device is 153.35.244.33, and that a routing protocol from a prior hop to network device 102-*x* is ISIS.

In FIG. 11, response 1104 includes the total of 20 output lines that correspond to 20 network devices on a route that starts from the network device from which the command was input and ends at the target device (i.e., "qb-inf100.wiggle.com").

In response 1104, some the output lines show asterisks (i.e., "*") in place of a name of routing protocol. These output lines correspond to reply packets that are sent from network device that do not identify a routing protocol. In such instances, RAP trace requester 306 may be unable to obtain the protocol, and, thus, may output "*"

The above examples illustrate how a network device may trace a route that extends from the network device to a target device and identify protocols that are associated with the route. To trace a route and identify protocols, the network device may send test packets, to which devices in network 100 may respond with reply packets. The network device may examine the reply packets to identify the route/path and the protocols.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Further, while series of acts have been described with respect to FIGS. 4 and 7, the order of the acts may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A non-transitory computer-readable medium comprising computer-executable instructions, the computer-executable instructions including instructions for: receiving a request to: trace a route, in a network including a plurality of network devices, between a source device and a target device, and identify protocols, of a particular type, that are associated with the route; sending, from the source device, at least one test packet with a first time-to-live, toward the target device, to collect: an identity of one or more of the network devices in the route, and protocol information indicative of a protocol implemented in a path, of the route, between two of the plurality of network devices; receiving, from the network, at least one reply packet when the first time-to-live has expired, wherein a payload of the at least one reply packet includes: a first list of the one or more network devices and the protocol implemented in a first path en route toward the target device, and a second list of the one or more network devices and the protocol implemented in a second path en route to the source device, wherein the first list differs from the second list; examining the payload of the at least one reply packet to: determine at least a portion of the route, including the first path and the second path, and identify the protocol implemented in the first and second paths of the route; outputting a description of the at least a portion of the route and respective identities of the protocols corresponding to the first and second paths of the route; and sending another test packet with a second time-to-live toward the target device, wherein the second time-to-live that is greater than the first time-to-live.

2. The non-transitory computer-readable medium of claim 1, wherein the instructions for sending at least one test packet from the source device toward the target device includes instructions for: sending the at least one test packet to a first network device on the route; and receiving the reply packet with the payload, from the first network device, the payload including: an address of the first network device, the protocol information collected by the at least one test packet en route to the first network device, and protocol information collected by the at least one reply packet en route to the source device.

3. The non-transitory computer-readable medium of claim 1, wherein the particular type of protocol includes at least one of:
   a protocol for forwarding the at least one test packet; or
   a routing protocol.

4. The non-transitory computer-readable medium of claim 3, wherein the protocol for forwarding the at least one test packet includes a multiprotocol label switching (MPLS) protocol.

5. The non-transitory computer-readable medium of claim 3, wherein the routing protocol includes one of:
   a label distribution protocol (LDP);
   a resource reservation protocol (RSVP);
   an intermediate-system to intermediate-system (ISIS) protocol; or
   a border gateway protocol (BGP).

6. The non-transitory computer-readable medium of claim 1, wherein the payload includes a protocol field.

7. The non-transitory computer-readable medium of claim 1, wherein the at least one reply packet includes an Internet Control Message Protocol (ICMP) reply packet that indicates a time-to-live of the at least one test packet is zero.

8. The non-transitory computer-readable medium of claim 1, wherein receiving a request to trace a route includes instructions for:
accepting, from a user, a command line request that includes a command, an identifier associated with the target device, and the particular protocol type.

9. A method comprising: receiving a request to identify: a network path including a source device, a plurality of intermediary devices, and a target device, and protocols, of a particular type, implemented in the network path; sending, from the source device, a test packet with a first time-to-live, toward the target device, to collect first protocol information indicative of respective protocols for handling the test packet in a plurality of path segments between the intermediary devices in an outbound portion the network path; receiving a reply packet in response to the test packet, when the first time-to-live has expired, wherein a payload of the reply packet includes the first protocol information and second protocol information collected by the reply packet, wherein the second protocol information is indicative of respective protocols for handling the reply packet in a plurality of path segments between the intermediary devices in an inbound portion of the network path, wherein the outbound portion of the network path differs from the inbound portion of the network path; examining the reply packet to identify: the respective protocols corresponding to each of the path segments, and the intermediary devices in the outbound portion and the inbound portion of the network path; outputting the identities of the respective protocols implemented in each of the path segments, and a representation of the network path; and sending another test packet with a second time-to-live toward the target device, wherein the second time-to-live that is greater than the first time-to-live.

10. The method of claim 9, wherein sending the test packet includes: setting the first time-to-live of the test packet to a value to expire before reaching a particular intermediary device on the outbound portion of the network path; and wherein receiving a reply packet includes: receiving the reply packet, generated by the particular intermediary device, indicating that the time-to-live has a value of zero.

11. The method of claim 10, further comprising:
sending another test packet with an incremented time-to-live value toward the particular intermediary device; and
receiving, in response to the other test packet, another reply packet generated by a next hop intermediary device.

12. The method of claim 10, wherein examining the reply packet includes:
obtaining a source Internet Protocol (IP) address, of the intermediary devices, written to a protocol field of the payload of the reply packet; and
extracting a value in the protocol field in the payload of the reply packet.

13. The method of claim 9, wherein sending a test packet includes sending a test packet that reaches the target device.

14. The method of claim 9, further comprising:
placing an Internet Protocol (IP) address of a particular intermediary device onto the payload of the reply packet, including:
writing, onto the payload of the reply packet, a name of a routing protocol that is associated with the path segment between a prior hop intermediary device and the particular intermediary device; or
writing, onto the payload of the reply packet, a name of a routing protocol that is associated with the path segment between the particular intermediary device and a next hop intermediary device.

15. The method of claim 9, wherein receiving a reply packet includes:
receiving an Internet Control Message Protocol (ICMP) reply message.

16. The method of claim 9, wherein sending a test packet includes: forwarding the test packet to a particular intermediary device that examines the first time-to-live of the test packet, generates and sends the reply packet to the source device when the time-to-live is zero, or forwards the test packet to next hop intermediary device on the network path toward the target device when the time-to-live is not zero.

17. A device comprising: a communication interface configured to: receive a test packet en route, via an outbound path, to a destination device in a network, transmit, when a time-to-live value of the test packet greater than zero, a modified version of the test packet toward the destination device via the outbound path, receive a reply packet, corresponding to the test packet, en route, via an inbound path, to an origination device in the network, and transmit a modified version of the reply packet toward the origination device via the inbound path, wherein the outbound path and the inbound path differ and the reply packet indicates that the time-to-live value of the modified version of the test packet is zero; and a processor configured to: determine that the time-to-live value of the test packet is greater than zero, decrement the time-to-live value of the test packet before transmitting the modified version of the test packet, write a network address of the device and a network protocol, used by the device, into a payload of the test packet, to form the modified version of the test packet, and write the network address of the device and the network protocol, used by the device, into a payload of the reply packet, to form the modified version of the reply packet.

* * * * *